United States Patent
Ademoye

(10) Patent No.: US 10,389,287 B2
(45) Date of Patent: Aug. 20, 2019

(54) SYSTEMS AND METHODS FOR CONTROLLING A PERMANENT MAGNET SYNCHRONOUS MOTOR

(71) Applicant: Baker Hughes, a GE company, LLC, Houston, TX (US)

(72) Inventor: Taoridi A. Ademoye, Broken Arrow, OK (US)

(73) Assignee: Baker Hughes, a GE company, LLC, Houston, TX (US)

(\*) Notice: Subject to any disclaimer, the term of this patent is extended or adjusted under 35 U.S.C. 154(b) by 0 days.

(21) Appl. No.: 15/970,028

(22) Filed: May 3, 2018

(65) Prior Publication Data

US 2018/0254728 A1    Sep. 6, 2018

Related U.S. Application Data

(63) Continuation of application No. 15/281,388, filed on Sep. 30, 2016, now Pat. No. 10,044,306.

(60) Provisional application No. 62/250,299, filed on Nov. 3, 2015.

(51) Int. Cl.
| | | |
|---|---|---|
| *H02P 21/00* | (2016.01) | |
| *H02P 21/18* | (2016.01) | |
| *E21B 43/12* | (2006.01) | |
| *H02P 21/13* | (2006.01) | |
| *H02P 21/24* | (2016.01) | |

(52) U.S. Cl.
CPC ............ *H02P 21/18* (2016.02); *E21B 43/128* (2013.01); *H02P 21/13* (2013.01); *H02P 21/24* (2016.02)

(58) Field of Classification Search
CPC ........ H02P 21/0003; H02P 27/06; H02P 6/08; E21B 43/128
USPC ...................................... 318/400.02
See application file for complete search history.

(56) References Cited

U.S. PATENT DOCUMENTS

| | | | |
|---|---|---|---|
| 5,235,259 A | 8/1993 | Dhindsa | |
| 6,005,362 A | 12/1999 | Enjeti | |
| 7,607,896 B2 * | 10/2009 | Leuthen | ............... H02H 7/1222 417/44.1 |
| 8,672,641 B2 | 3/2014 | Yuratich | |
| 2004/0257028 A1 * | 12/2004 | Schulz | ..................... H02P 6/18 318/802 |
| 2005/0248306 A1 * | 11/2005 | Chen | ........................ H02P 6/16 318/712 |

(Continued)

*Primary Examiner* — Jorge L Carrasquillo
*Assistant Examiner* — Gabriel Agared
(74) *Attorney, Agent, or Firm* — Sprinkle IP Law Group

(57) ABSTRACT

Systems and methods for controlling a permanent magnet synchronous motor to eliminate the need to filter a PWM output of the motor's drive system. In one embodiment, the motor's drive transforms measured output currents to a d-q reference frame and uses these to determine demanded Vd and Vq voltages. An inverter angle is determined from the difference between the demanded Vd and Vq voltages. A demanded bus voltage is determined as the square root of the sum of the square of the demanded Vq and the demanded Vd, multiplied by 2/pi. An inverter angle is determined as the arctangent of (−demanded Vd/demanded Vq). The demanded and actual bus voltages are used to determine a firing angle for the converter. The controller uses this information to generate a six-step waveform that can be provided to the motor without requiring output filtering.

10 Claims, 4 Drawing Sheets

(56) References Cited

U.S. PATENT DOCUMENTS

| | | | |
|---|---|---|---|
| 2006/0192519 A1* | 8/2006 | Nakakita | B60L 11/1803 318/801 |
| 2007/0128048 A1* | 6/2007 | Gonnella | F04B 25/00 417/44.1 |
| 2007/0263331 A1 | 11/2007 | Leuthen | |
| 2009/0309524 A1 | 12/2009 | Rider | |
| 2010/0125384 A1* | 5/2010 | Wyatt | B60K 7/0007 701/22 |
| 2011/0084638 A1* | 4/2011 | Patel | B60K 1/02 318/400.32 |
| 2011/0120424 A1* | 5/2011 | Fischer | F02D 41/3082 123/497 |
| 2012/0205119 A1* | 8/2012 | Wentworth | F04B 49/06 166/369 |
| 2014/0363318 A1* | 12/2014 | Wang | F04B 49/06 417/366 |

* cited by examiner

SYSTEMS AND METHODS FOR CONTROLLING A PERMANENT MAGNET SYNCHRONOUS MOTOR

CROSS-REFERENCE TO RELATED APPLICATIONS

This application is a continuation of U.S. patent application Ser. No. 15/281,388, filed Sep. 30, 2016, which claims the benefit of U.S. Provisional Patent Application 62/250,299, filed Nov. 3, 2015 by Taoridi A. Ademoye. All of the foregoing patent applications are incorporated by reference as if set forth herein in their entirety.

BACKGROUND

Field of the Invention

The invention relates generally to motors, and more particularly to means for controlling a permanent magnet synchronous motor in a manner that eliminates the need to filter a PWM voltage at the output of a drive system for the motor.

Related Art

In the production of oil from wells, it is often necessary to use an artificial lift system to maintain the flow of oil. Artificial lift systems may utilize various different types of pumps to lift the oil out of the well. For instance, some conventional installations use rod lift systems in which a surface motor moves a sucker rod up and down in a reciprocating motion to drive a linear pump in the well. Other installations use electric submersible pumps (ESP's) in which a motor and a pump are positioned downhole in the well to pump oil out of the well. ESP's may use motors that have rotary or linear designs, and they may be permanent-magnet or induction motors. These motors are normally powered by electric drive systems that are positioned at the surface of the well.

In one type of ESP, a permanent magnet synchronous motor is used to drive the ESP's pump. A drive system that uses field oriented control techniques is used to provide power to the motor. A field oriented control system controls the voltages that are output by the drive and are provided to the motor (thereby indirectly controlling the currents in the motor's stator). The output voltages are controlled based on a transformation of the time dependent three phase output currents into a time invariant vector in what is referred to as the d-q plane (where d represents a flux component of the vector and q represents a torque component).

Typically, a field oriented control system for a permanent magnet synchronous motor (either rotary or linear) generates some form of PWM voltage outputs. Variable speed drives (VSD's) that generate PWM output voltages to drive deep well ESP's normally require filters at their outputs to remove the high frequency components of the PWM voltages which are caused by the high frequency switching of the IGBTs (insulated gate bipolar transistors) in the drive's inverter. This is necessary because of the length of the power cable that carries the output voltages to the ESP motor.

One of the problems with this type of control system is that the need to include the PWM output filters increases the cost of the system. Additionally, the high frequency switching of the IGBTs that are used in the inverter section of the drive generate losses in the form of heat. This will require extra cooling within the drive enclosure, which will further increase the cost of the system.

It would therefore be desirable to provide systems and methods for controlling the ESP motor that do not require the output filters or extra cooling that is necessitated by the generation of the PWM output voltage.

SUMMARY OF THE INVENTION

This disclosure is directed to systems and methods for providing field oriented control of a motor that solve one or more of the problems discussed above. One particular embodiment is an ESP system that includes a pump, a motor that is coupled to the pump and an electric drive that provides output power to the motor and thereby drives the motor and pump. The electric drive includes a converter, an inverter, a DC bus coupled between the converter and the inverter, and a controller that controls the operation of the converter and the inverter, and thereby controls the output of the drive. The electric drive receives measurements of the currents output from the inverter (three phases in one embodiment) and transforms the measured output currents to Id and Iq currents in a d-q reference frame. The electric drive determines a demanded Vd voltage in dependence on a difference between the Id current and the Id reference value (e.g., by providing these inputs to a proportional integral controller). Similarly, the drive determines a demanded Vq voltage in dependence on a difference between the Iq current and the Iq reference value. The electric drive determines an inverter angle and a demanded bus voltage in dependence on the demanded Vd voltage and the demanded Vq voltage. The drive also determines a converter firing angle in dependence on a difference between the demanded bus voltage and a measured bus voltage. The drive's converter is controlled using this firing angle, thereby producing the demanded bus voltage on the DC bus. The drive operates the inverter in dependence on the inverter angle and thereby produces a six-step output waveform which is provided to the motor. In one embodiment, the electric drive determines the demanded bus voltage by taking the square root of the sum of the square of the demanded Vq voltage and the demanded Vd voltage, and multiplying the result by 2/pi., and wherein the electric drive determines the inverter angle by taking the arctangent of a quotient of the negative demanded Vd voltage divided by the demanded Vq voltage. Proportional integral controllers may be used to determine the Iq reference value, the demanded Vd and Vq values, inverter and converter firing angles, and demanded bus voltage.

Another embodiment comprises a method for controlling a motor. In this method, the output currents of power provided to a motor by an electric drive are measured. The output currents are transformed to Id and Iq currents in a d-q reference frame (e.g., using a Clark and Park technique) based on an estimated rotor angle of the motor. A demanded Vd voltage is determined in dependence on the difference between the Id current and an Id reference value, such as by applying the difference to a proportional integral controller. A demanded Vq voltage is determined in dependence on the difference between the Iq current and the Iq reference value. Again, a proportional integral controller may be used. In one embodiment, the Iq reference value is determined by applying the difference between an estimated speed of the motor and a reference speed to a proportional integral controller to produce the Iq reference value. An inverter angle is determined in dependence on the demanded Vd voltage and the demanded Vq voltage (e.g., by taking the arctangent of a quotient of the negative demanded Vd voltage divided by the demanded Vq voltage). A demanded bus voltage is determined in dependence on the demanded Vd voltage and the demanded Vq voltage. This may be done, for example, by taking the square root of the sum of the square of the demanded Vq voltage and the demanded Vd voltage, and multiplying the result by 2/pi. A converter firing angle is determined in dependence on a difference between the demanded bus voltage and a measured bus voltage. The converter of the electric drive is operated in dependence on the converter firing angle, thereby producing the demanded bus voltage on a DC bus coupled between the converter and an inverter of the electric drive. The inverter of the drive is operated in dependence on the inverter angle, thereby producing a six-step output waveform which is provided to the motor.

Yet another embodiment comprises an electric drive system. The electric drive system is configured to provide output power suitable to drive a motor. The electric drive system has a converter, an inverter, and a DC bus coupled between the converter and the inverter. The drive system also has a controller that controls the operation of the converter and the inverter, and thereby controls the output of the drive. The electric drive senses the output currents (e.g., for each of three phases of the output power) and the controller transforms the measured output currents to Id and Iq currents in a d-q reference frame. The controller determines a demanded Vd voltage in dependence on a difference between the Id current and the Id reference value and determines a demanded Vq voltage in dependence on a difference between the Iq current and the Iq reference value (e.g., using proportional integral controllers). The controller determines an inverter angle and a demanded bus voltage in dependence on the demanded Vd voltage and the demanded Vq voltage. The controller also determines a converter firing angle in dependence on a difference between the demanded bus voltage and a measured bus voltage. The drive's converter is controlled using this firing angle, thereby producing the demanded bus voltage on the DC bus. The controller operates the inverter in dependence on the inverter angle and thereby produces a six-step output waveform which is provided to the motor. In one embodiment, the controller determines the demanded bus voltage by taking the square root of the sum of the square of the demanded Vq voltage and the demanded Vd voltage, and multiplying the result by 2/pi., and wherein the controller determines the inverter angle by taking the arctangent of a quotient of the negative demanded Vd voltage divided by the demanded Vq voltage. Proportional integral controllers may be used to determine the Iq reference value, the demanded Vd and Vq values, inverter and converter firing angles, and demanded bus voltage.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
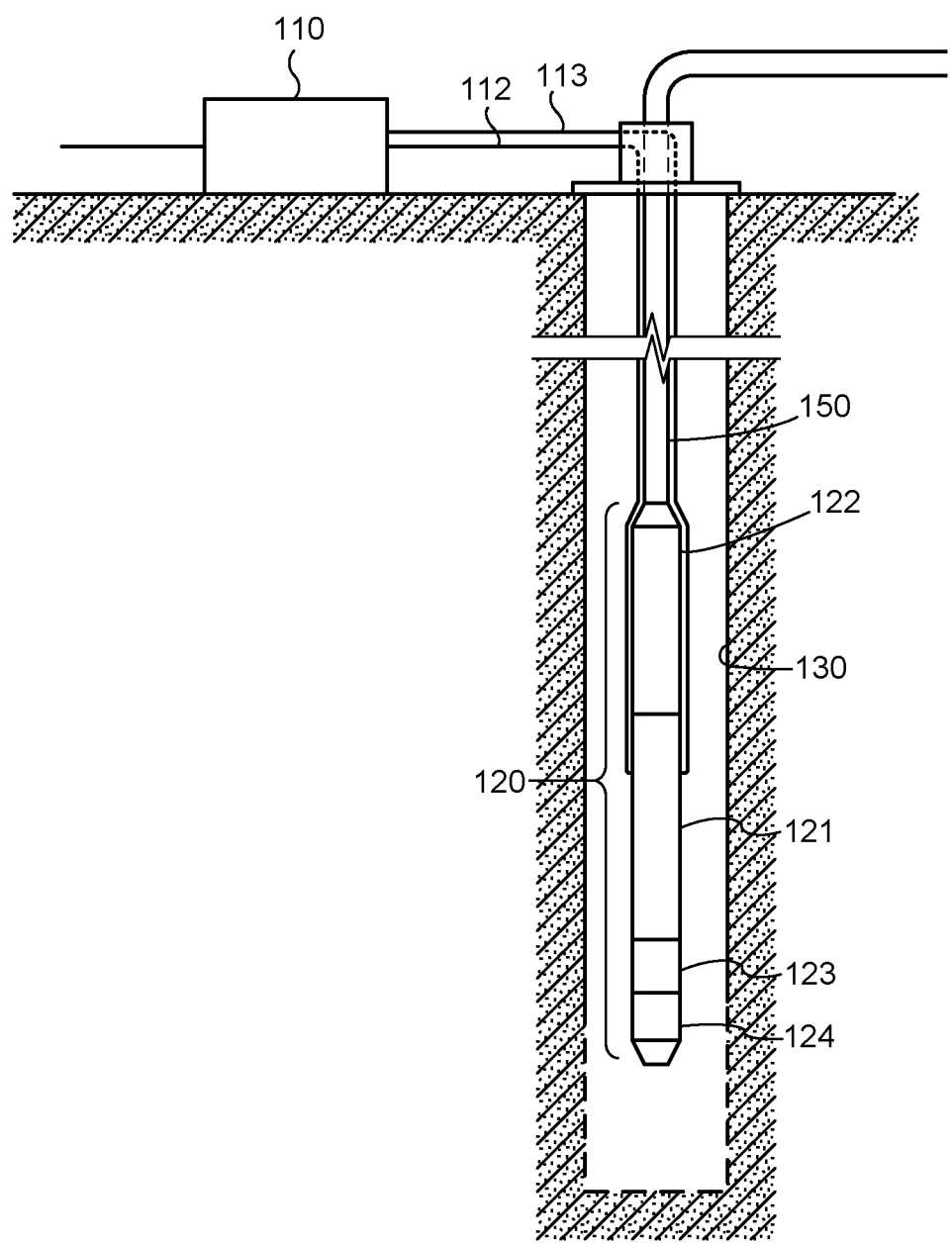
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for performing field oriented control of a permanent magnet synchronous motor. In one embodiment, these methods are performed in an electric drive system that is positioned at the surface of a deep well, wherein the drive system provides power to a linear motor of an ESP that is positioned in the well. The present systems and methods are used to generate six-step, three-phase voltages that can be carried over a power cable to the ESP motor without having to filter the voltages at the output of the drive system.

The present systems and methods have a number of advantages over the prior art. For instance, because the drive system generates six-step output voltages instead of PWM voltages, the switching frequency of the IGBTs in the drive's inverter is reduced in comparison to traditional system that produce a PWM output, so less heat is generated in the drive and less cooling is required. Additionally, because it is not necessary to filter the six-step output voltages before they are carried over the poser cable to the ESP motor, the output filters that are required in traditional drive systems can be eliminated, thereby reducing the cost of the system.

The present systems and methods will be described below with respect to an exemplary system that drives a linear motor. Alternative embodiments may use rotary motors instead of linear motors. Because either type of motor can be used, references herein to one type of motor can be applied to the other type of motor as well. For instance, references to a rotor of a rotary motor are applicable to the mover of a linear motor as well, and vice versa. Similarly, references to the position or speed of the motor can be applied to either the rotary motion of the rotor in a rotary motor, or the reciprocating motion of the mover in a linear motor.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well. Control system 110 is coupled to pump 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In one embodiment, motor section 121 is a linear electric motor. In other embodiments the motor could be a rotary motor. Control system 110 receives AC (alternating current) input power from an external source such as a generator (not shown in the figure), rectifies the AC input power and then converts the DC (direct current) power to produce three-phase AC output power which is suitable to drive the linear motor. The output power generated by control system 110 is dependent in part upon the position of the mover within the stator of the linear motor. Position sensors in the motor sense the position of the mover and communicate this information via electrical lines 113 to control system 110 so that the mover will be driven in the proper direction (as will be discussed in more detail below). The output power generated by control system 110 is provided to pump system 120 via power cable 112.

Figure 2:
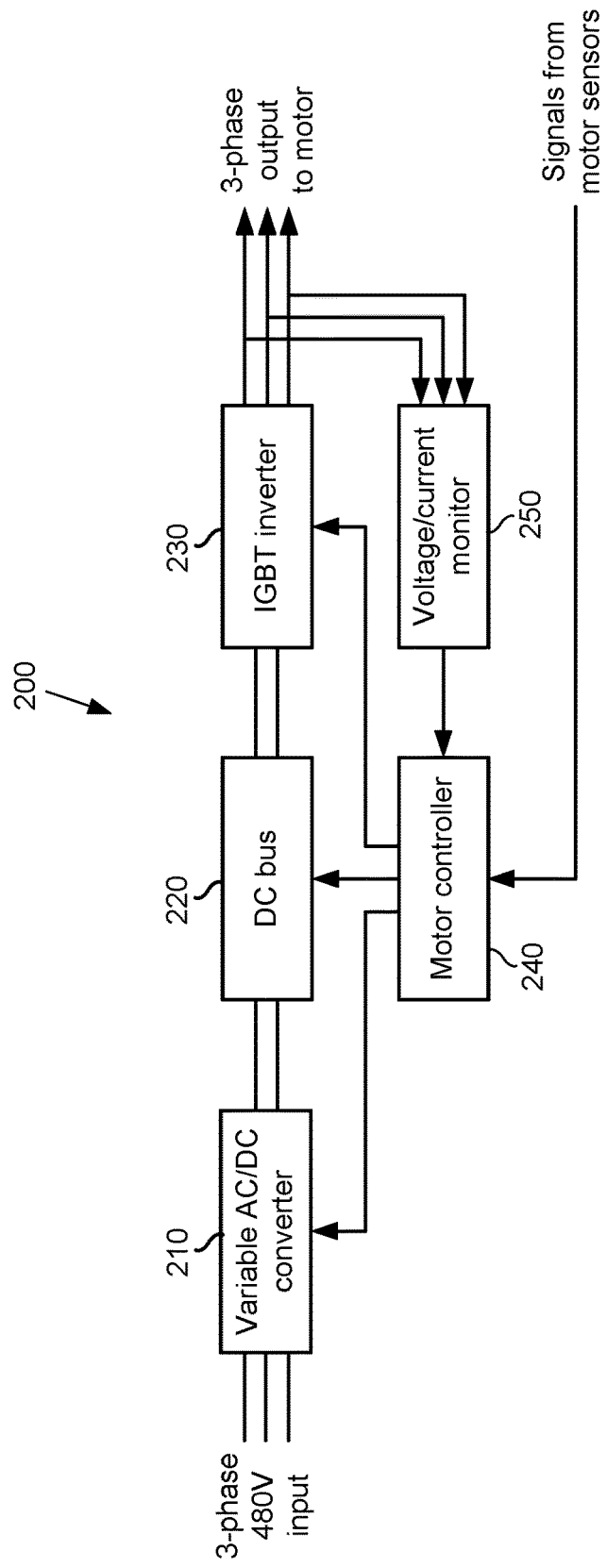
FIG. 2 is a functional block diagram illustrating the structure of a control system for a linear motor in accordance with one embodiment.

Referring to FIG. 2, a functional block diagram illustrating the structure of a control system for a linear motor in one embodiment is shown. The control system is incorporated into a drive system for the linear motor. The drive system receives AC input power from an external source and generates three-phase output power that is provided to the linear motor to run the motor. The drive system also monitors the current drawn by the motor and uses instantaneous current vectors to determine the instantaneous force generated by the motor. The operation of the motor can then be controlled as needed in accordance with the generated force information.

As depicted in FIG. 2, drive system 200 has a variable AC/DC converter that receives AC input power from the external power source. The input power may be, for example, 480V, three-phase power. Circuitry 210 converts the received AC power to DC power and provides this power to a DC bus 220. The DC power on DC bus 220 is input to an inverter 230 which may use, for example IGBT switches to produce three-phase output power at a desired voltage and frequency. The output power produced by inverter 230 is transmitted to the downhole linear motor via a power cable.

The power output by inverter 230 is monitored by voltage and current sensors 250 installed on the output of the drive. Sensors 250 provide a signal which indicates the current drawn by the linear motor as an input to motor controller 240. Motor controller 240 may also receive information from the downhole linear motor (e.g., position signals from hall sensors in the motor) and/or other equipment positioned in the well. This information may be provided to an operator, and/or it may be used by motor controller 240 to control the output power that is generated by drive system 200.

Figure 3:
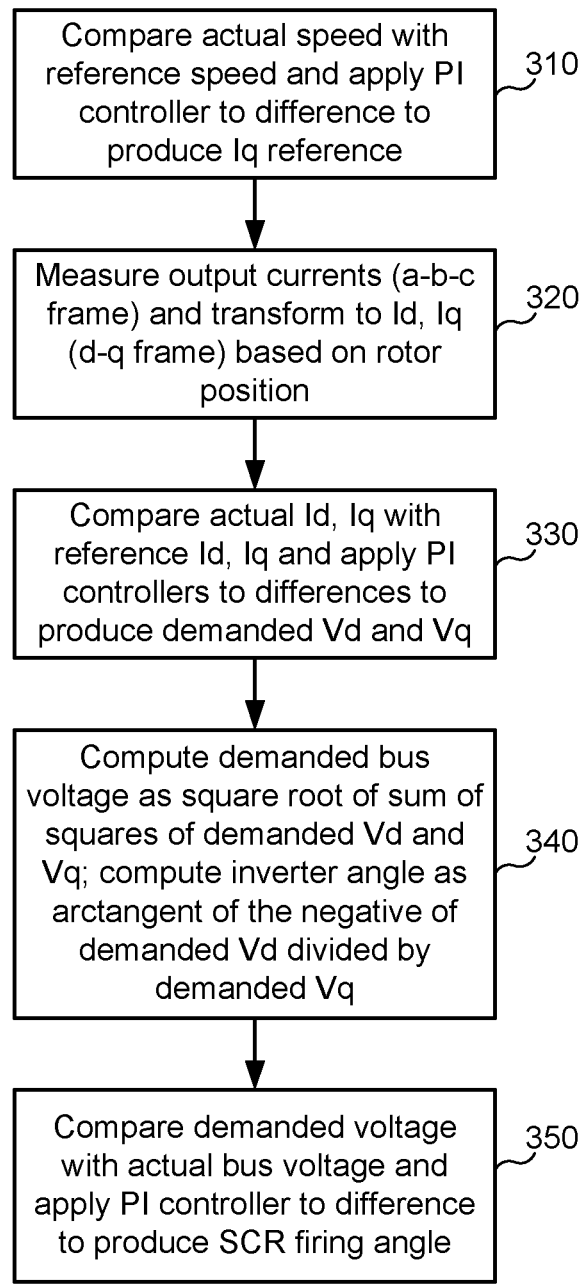
FIG. 3 is a flow diagram illustrating a method for controlling a motor in accordance with one embodiment.

Referring to FIG. 3, a flow diagram illustrating the control of a motor in accordance with one embodiment is shown. In this embodiment, the controller implements a field oriented control algorithm, but the algorithm is a non-conventional algorithm that generates a six-step output voltage instead of a traditional technique that is used to generate a PWM output voltage. In the first step, a desired or reference speed is compared with the actual speed, which may be observed, calculated or estimated (310). A PI (proportional integral) controller is applied to the difference between the signals representing the desired and actual speeds (310). The output currents of the drive are measured for phases a, b and c, and the estimated rotor position is used to transform these currents from an a-b-c reference frame to a rotor reference (d-q) frame using the Clark and Park techniques (320). In one embodiment, an observer is used to estimate both the speed and the position of the rotor of the motor.

For field oriented control, it is assumed by that the output torque (or thrust) of the motor and the stator flux can be indirectly controlled by controlling the Iq and the Id components of the transformed output currents. Actual and reference values for the current components in the d-q reference frame (Iq and Id) are then compared, and PI controllers are applied to the differences between them (330). The reference or desired Iq is generated by a speed controller, and the reference Id is usually set to zero for a surface PM motor. The output of the PI controllers are the demanded Vd and Vq.

Steps 310-330 are common to traditional field oriented control systems that may be used to generate PWM output voltages. For instance, the demanded Vq and Vd can be transformed to a stationary reference frame, and a space vector modulation technique can be employed on the transformed signal to generate PWM switching patterns for the inverter's IGBTs. In the present method, however, the demanded bus voltage is obtained by taking the square root of the sum of the square of the demanded Vq and the demanded Vd, and multiplying the result by 2/pi (340):

$$\text{demanded voltage} = sqrt(Vd^{*2} + Vq^{*2})$$

The inverter angle is obtained by taking the arctangent of the product of the negative of the demanded Vd and the inverse of the demanded Vq (340):

$$\text{inverter angle} = \tan^{-1}(-Vd^*/Vq^*)$$

The demanded voltage Vd is compared with the DC bus voltage, and a PI controller is applied to the difference between these two signals (350). The output of the PI controller is the firing angle that drives the SCRs (silicon controlled rectifiers) in the controller's rectifier section. The inverter angle is added to the estimated rotor angle to obtain theta, which is used to generate the switching pattern for the inverter's IGBTs. The typical field oriented control algorithm does not include this stage. The IGBTs in the inverter section generate three-phase, six-step voltages that are provided to the power cable and are carried by the power cable to the motor of the ESP positioned downhole in the well. No filtering of the six-step voltages is required before they are carried by the cable to the motor.

Figure 4:
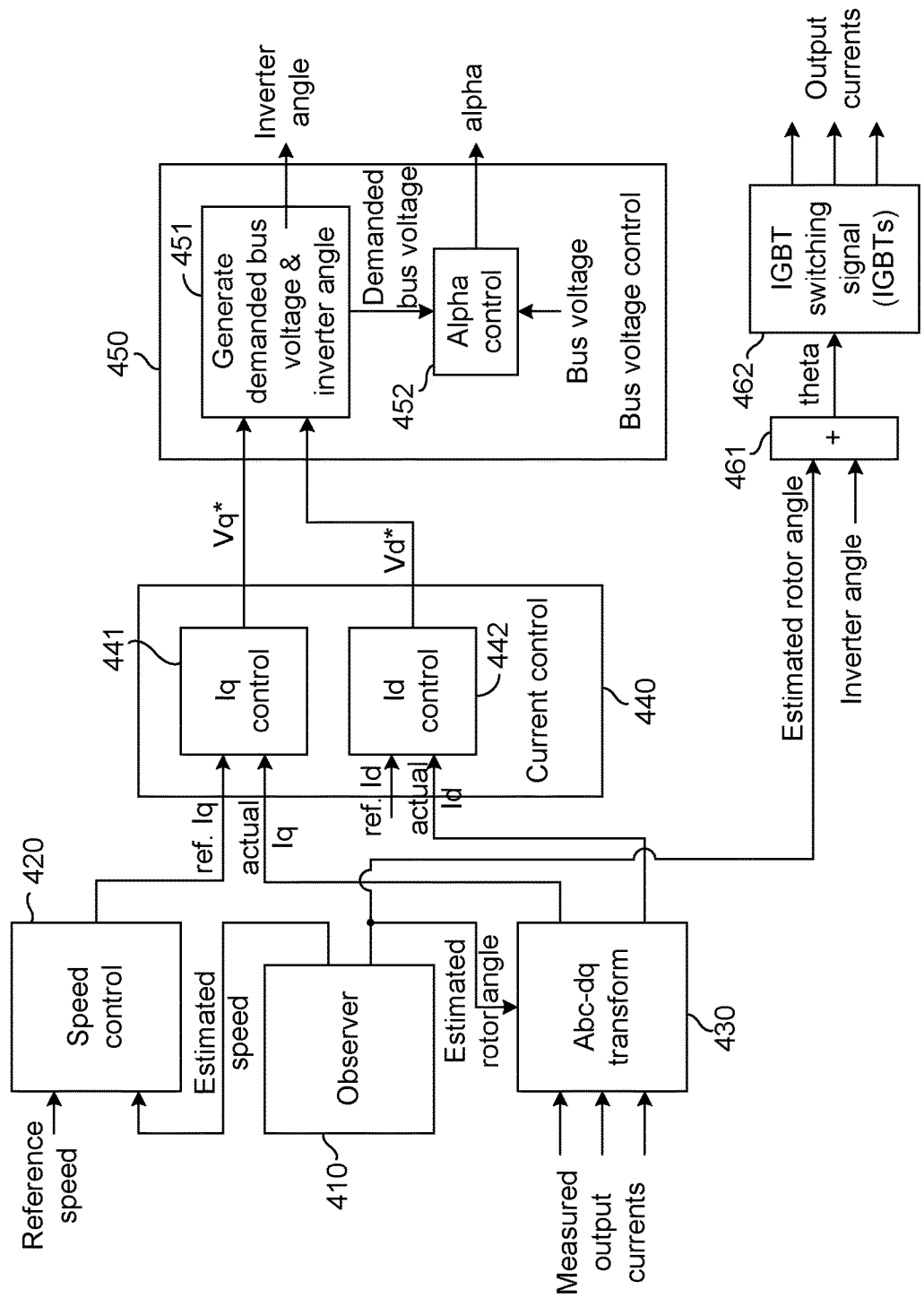
FIG. 4 is a functional block diagram illustrating the components of a field oriented control system for an electric drive unit in accordance with one embodiment.

Referring to FIG. 4, a functional block diagram illustrating the components of a field oriented control system for an electric drive unit in accordance with one embodiment is shown. In this embodiment, an observer 410 produces an estimated speed of the rotor in the motor. The estimated speed and a reference speed are provided to a speed control (420). Speed control (420) takes the difference between these values and generates a reference value for Id based on the difference between the speed values. Observer 410 also produces an estimated rotor angle/position which is provided to an abc/dq transformation unit 430. Abc/dq transformation unit 430 uses the estimated rotor angle/position to transform the measured values of the currents of each phase output by the drive to current components Id and Iq in the d-q frame.

Abc/dq transformation unit 430 provides the actual Id and Iq values to a current control unit 440. The actual Id value and the reference Iq value generated by speed control 420 are provided to an Iq control subunit 441. Iq control subunit 441 takes the difference between these values and applies a PI controller to the difference to produce the demanded Vq (Vq*). The actual Id value and a reference Id value, which is set to 0, are provided to an Id control subunit 442. Id control subunit 442 takes the difference between these values and applies a PI controller to the difference to produce the demanded Vd (Vd*).

The demanded Vd and Vq are provided to a bus voltage control 450. Subunit 451 generates a demanded bus voltage and inverter angle based on the received values of demanded Vd and Vq. The demanded bus voltage is provided to an alpha control subunit 452. Subunit 452 compares the actual and demanded bus voltages and applies a PI controller to the difference to produce alpha, which is the firing angle that drives the SCRs of the drive's rectifier section and thereby controls the bus voltage. The inverter angle is provided to unit 461, which adds it to the estimated rotor angle received from observer 410 to produce theta. Theta is used to generate the switching pattern for the inverter's IGBTs to produce the six-step output voltages.

The present systems and methods have advantages with respect to traditional field oriented control techniques that generate PWM voltages to drive downhole motors. As noted above, the generation of six-step output voltages instead of PWM voltages reduces the switching frequency of the IGBTs in the drive's inverter, so less heat is generated by the inverter and less cooling is required. Further, because the six-step output voltages can be efficiently carried over the poser cable to the ESP motor, it is not necessary to incur the expense of filtering the drive's output. The reduction of the cooling requirements and elimination of the filtering requirements significantly reduces the cost of the system.

The preceding description of the disclosed embodiments is provided to enable any person skilled in the art to make or use the present invention. Various modifications to these embodiments will be readily apparent to those skilled in the art. For instance, the functions described above in connection with the motor controller may be distributed among one or more other components of the drive system. The generic principles defined herein may therefore be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

What is claimed is:

1. An electric submersible pump system comprising:
   a pump;
   a motor coupled to the pump, wherein the motor drives the pump; and
   an electric drive coupled to the motor, wherein the electric drive provides output power to the motor and thereby drives the motor;
   wherein the electric drive includes a converter, an inverter, a DC bus coupled to convey DC power from the converter to the inverter, and a controller coupled to the converter and the inverter;
   wherein the electric drive determines currents output from the inverter and transforms the measured output currents to Id and Iq currents in a d-q reference frame;
   wherein the electric drive determines a demanded Vd voltage in dependence on a difference between the Id current and the Id reference value and determines a demanded Vq voltage in dependence on a difference between the Iq current and the Iq reference value;
   wherein the electric drive determines an inverter angle and a demanded bus voltage in dependence on the demanded Vd voltage and the demanded Vq voltage;
   wherein the electric drive determines a converter firing angle in dependence on a difference between the demanded bus voltage and a measured bus voltage and controls the converter, thereby producing the demanded bus voltage on the DC bus; and
   wherein the electric drive operates the inverter in dependence on the inverter angle and thereby produces a six-step output waveform which is provided to the motor;
   wherein the electric drive determines the demanded Vd voltage after determining the difference between the Id current and the Id reference value;
   wherein the electric drive determines the demanded Vq voltage after determining the difference between the lq current and the Iq reference value;
   wherein the electric drive determines the inverter angle and the demanded bus voltage after determining the demanded Vd voltage and the demanded Vq voltage;
   wherein the electric drive determines the converter firing angle after determining the difference between the demanded bus voltage and the measured bus voltage.

2. The electric submersible pump system of claim 1, wherein the controller includes a first proportional integral controller that determines the Iq reference value, a second proportional integral controller that determines the demanded Vd voltage in dependence on the difference between the Id current and the Id reference value, and a third proportional integral controller that determines the demanded Vq voltage in dependence on the difference between the Iq current and the Iq reference value.

3. A method for controlling a motor, the method comprising:
   measuring output currents of power provided to the motor by an electric drive and transforming the output currents to Id and Iq currents in a d-q reference frame;
   determining a demanded Vd voltage in dependence on a difference between the Id current and an Id reference value, wherein the demanded Vd voltage is determined after determining the difference between the Id current and the Id reference value;
   determining a demanded Vq voltage in dependence on a difference between the Iq current and an Iq reference value, wherein the demanded Vq voltage is determined after determining the difference between the Iq current and the Iq reference value;

determining an inverter angle in dependence on the demanded Vd voltage and the demanded Vq voltage, wherein the inverter angle is determined after determining the demanded Vd voltage and the demanded Vq voltage;

determining a demanded bus voltage in dependence on the demanded Vd voltage and the demanded Vq voltage, wherein the demanded bus voltage is determined after determining the demanded Vd voltage and the demanded Vq voltage;

determining a converter firing angle in dependence on a difference between the demanded bus voltage and a measured bus voltage, wherein the converter firing angle is determined after determining the difference between the demanded bus voltage and the measured bus voltage;

operating a converter of the electric drive in dependence on the converter firing angle and thereby producing the demanded bus voltage on a DC bus coupled between the converter and an inverter of the electric drive; and operating the inverter in dependence on the inverter angle and thereby producing a six-step output waveform as the power provided to the motor.

4. The method of claim 3, wherein transforming the output currents to Id and Iq currents in the d-q reference frame comprises using a Clark and Park technique to transform three-phase currents to Id and Iq currents.

5. The method of claim 3, wherein determining the Iq reference value comprises applying the difference between an estimated speed of the motor and a reference speed to a proportional integral controller and thereby producing the Iq reference value.

6. The method of claim 3, wherein determining the demanded Vd voltage comprises applying the difference between the Id current and the Id reference value to a proportional integral controller and thereby producing the demanded Vd voltage; and wherein determining the demanded Vq voltage comprises applying the difference between the Iq current and the Iq reference value to a proportional integral controller and thereby producing the demanded Vq voltage.

7. An electric drive system comprising:

a converter;

an inverter;

a DC bus coupled between the converter and the inverter, wherein the DC bus receives DC power from the converter and provides the DC power to the inverter; and a controller coupled to the converter and the inverter; wherein the controller:

receives measurements of currents output from the inverter, transforms the measured output currents to Id and Iq currents in a d-q reference frame, determines a demanded Vd voltage in dependence on a difference between the Id current and the Id reference value, wherein the controller determines the demanded Vd voltage after determining the difference between the Id current and the Id reference value, determines a demanded Vq voltage in dependence on a difference between the Iq current and the Iq reference value, wherein the controller determines the demanded Vq voltage after determining the difference between the Iq current and the Iq reference value, determines an inverter angle in dependence on the demanded Vd voltage and the demanded Vq voltage, wherein the controller determines the inverter angle after determining the demanded Vd voltage and the demanded Vq voltage, determines a demanded bus voltage in dependence on the demanded Vd voltage and the demanded Vq voltage, wherein the controller determines the demanded bus voltage after determining the demanded Vd voltage and the demanded Vq voltage, determines a converter firing angle in dependence on a difference between the demanded bus voltage and a measured bus voltage, wherein the controller determines the converter firing angle after determining the difference between the demanded bus voltage and the measured bus voltage, controls the converter of the electric drive in dependence on the converter firing angle and thereby controlling the demanded bus voltage on the DC bus, and operates the inverter in dependence on the inverter angle and thereby controls the inverter to output a six-step output waveform.

8. The electric drive system of claim 7, wherein the controller receives an estimated rotor angle from an observer and transforms the output currents to Id and Iq currents in dependence on the rotor angle.

9. The electric drive system of claim 7, wherein the controller includes a first proportional integral controller that determines the Iq reference value.

10. The electric drive system of claim 9, wherein the controller includes a second proportional integral controller that determines the demanded Vd voltage in dependence on the difference between the Id current and the Id reference value, and wherein the controller includes a third proportional integral controller that determines the demanded Vq voltage in dependence on the difference between the Iq current and the Iq reference value.

* * * * *